United States Patent
Nakamura et al.

(10) Patent No.: US 6,906,660 B2
(45) Date of Patent: Jun. 14, 2005

(54) RADAR SYSTEM AND CAR RADAR SYSTEM

(75) Inventors: Kazuto Nakamura, Hitachinaka (JP); Ryuji Fukute, Hitachinaka (JP); Atsushi Okonogii, Hitachinaka (JP); Kazuaki Takano, Mito (JP)

(73) Assignee: Hitachi, Ltd., Tokyo (JP)

( * ) Notice: Subject to any disclaimer, the term of this patent is extended or adjusted under 35 U.S.C. 154(b) by 14 days.

(21) Appl. No.: 10/663,746

(22) Filed: Sep. 17, 2003

(65) Prior Publication Data

US 2004/0140926 A1 Jul. 22, 2004

(30) Foreign Application Priority Data

Sep. 20, 2002 (JP) .................................. 2002-275129

(51) Int. Cl.[7] .............................................. G01S 13/00
(52) U.S. Cl. ........................... 342/70; 342/82; 342/85; 342/118; 342/175
(58) Field of Search .............................. 342/70–72, 82, 342/85, 118, 165, 173, 175, 198

(56) References Cited

U.S. PATENT DOCUMENTS

| | | | | |
|---|---|---|---|---|
| 4,327,333 A | * | 4/1982 | Wilcox | 330/278 |
| 5,631,810 A | | 5/1997 | Takano | |
| 6,300,815 B1 | * | 10/2001 | Hinterscher et al. | 327/309 |
| 2003/0201930 A1 | * | 10/2003 | Nagasaku et al. | 342/175 |

FOREIGN PATENT DOCUMENTS

| | | |
|---|---|---|
| JP | 2000077938 | 3/2000 |
| JP | 2001118693 | 4/2001 |
| JP | 2001-312318 | 11/2001 |

OTHER PUBLICATIONS

Richardson, R.; "A high performance solid state modulator for radar applications", Power Modulator Symposium, IEEE Conference Record of the 1990 Nineteenth, Jun. 26–28, 1990, pp.: 483–491.*

Chunguang et al.; "A front–end of the FMCW anticollision radar", Microwave and Millimeter Wave Technology, 2nd International Conference on. ICMMT 2000, Sep. 14–16, 2000, pp.: 568–571.*

Kitazume et al.; "Advances in millimeter–wave subsystems in Japan", Microwave Theory and Techniques, IEEE Transactions on , vol.: 39, Issue: 5, May 1991, pp.: 775–781.*

* cited by examiner

Primary Examiner—Thomas H. Tarcza
Assistant Examiner—Isam Alsomiri
(74) Attorney, Agent, or Firm—Crowell & Moring LLP

(57) ABSTRACT

To provide a radar system for controlling a gate power supply and drain power supply of a MMIC (microwave monolithic IC), protecting the MMIC at the time of start and shut-off, and simultaneously avoiding an occurrence of a failure in the MMIC due to a residual charge and an abnormal supply potential at the time of shut-off. A power supply control means controls the gate and drain power supplies at the rise time so that an output voltage of the gate power supply rises earlier than that of the drain power supply. Another power supply control means controls the gate and drain power supplies at the fall time so that an output voltage of the gate power supply falls later than that of the drain power supply. Another power supply control means turns off the drain power supply of the FET among power supplies when it is detected by a voltage monitoring means that even either of output voltages of the power supplies is not within said specified range.

7 Claims, 10 Drawing Sheets

RADAR SYSTEM AND CAR RADAR SYSTEM

BACKGROUND OF THE INVENTION

The present invention relates to a radar system and a car radar system and more particularly to a car radar system for detecting the range or range rate between an own car and a target such as a precedent car or an obstacle.

A radar using radio waves such as millimeter waves, since the propagation loss of a radio beam is little even in bad weather including rain or mist and radio waves reach far away, has been widely used In the fields of flight control and weather observation. Further, in recent years, in the field of prevention of a traffic accident and security of cars, a millimeter wave radar for measuring the distance from the car ahead and range rate with a precedent car has been researched, developed, and commercialized.

There are some kinds of high frequency circuits of a millimeter wave radar available, and particularly an MMIC (microwave monolithic IC) having the characteristics of small size, low cost, and high reliability is useful for cars.

The MMIC has a built-in FET (p-HEMT) with an AlGaAs/InGaAs double hetero structure having excellent high frequency characteristics, and in order to drive FET (Field Effect Transistor), it is necessary to control a plurality of power supplies of a drain power supply and a gate power supply.

An electron control unit having a plurality of power supplies is disclosed in Japanese Application Patent Laid-open Publication No. 2001-312318. The electron control unit, as shown in FIG. 12, has a plurality of power supplies of a 5V power supply 201 and a 3.3V power supply 202 and among them, the 3.3V power supply 202 is used as a power supply for a microcomputer 101 and a reset controller 102 for the microcomputer 101.

To prevent the microcomputer 101 from an unstable operation at the time of the start and shut-off of the power supply, the start and shut-off sequence as shown in FIG. 13 is realized. Namely, at the time of the start, the 3.3V power supply 202 rises, and then the 5V power supply circuit 201 rises, and after the delay time Treset elapses from the point of time where the 5V power supply reaches the reset level or higher, the microcomputer 101 is released from reset. Further, at the time of shut-off, the 5V power supply 201 falls earlier than the 3.3V power supply 202, and the microcomputer 101 is put into the reset state. Thereby, the indefinite operation area of the microcomputer can be eliminated.

The FET built in the MMIC for a millimeter wave radar changes the path width (the cross sectional area of the channel) of electrons moving from the supply to the drain by the gate voltage to be reversely biased, thereby controls the drain current. And so, if the drain power supply is applied in a state that no gate power supply is applied, the current to be supplied to the FET is not controlled, thus the FET may be broken down.

Therefore, in control of the two power supplies of the drain power supply and gate power supply of the FET, when the drain power supply is applied, the gate power supply must be applied always.

Further, even if the drain power supply of the FET is shut off, thereafter, when the gate power supply is shut off in a state that some charge remains in the drain circuit, an excess current flows in the FET by the residual charge, thus the FET may be broken down.

Further, when the drain power supply is applied in a state that the gate power supply and drain power supply of the FET are respectively at a potential beyond the specified ranges, the current to be supplied to the FET increases beyond the control area, thus the FET may be broken down.

In this respect, the prior art disclosed in Japanese Application Patent Laid-open Publication No. 2001-312318 mentioned above is unsolved in the following point. It will be explained hereunder by referring to FIG. 14.

In the constitution shown in FIG. 14, at the later stage of the 5V power supply, a plurality of power supplies are additionally installed. Namely, a (-)5V power supply 203 is operated by the 5V power supply 201, there exist circuit elements of both power supplies which are controlled by the 5V power supply 201 and the (-)5V power supply 203.

In such a circuit constitution, it is not sufficient only to eliminate the indefinite operation area of the microcomputer by controlling the operations of the 3.3V and 5V power supplies. Namely, it is necessary to provide a circuit constitution for protecting the circuit elements of both power supplies of the 5V power supply 201 and the (-)5V power supply 203 operating according to the 5V power supply 201. The prior art disclosed in Japanese Application Patent Laid-open Publication No. 2001-312318 cannot protect the FET of a millimeter wave radar using the aforementioned MMIC.

SUMMARY OF THE INVENTION

The present invention intends to provide a radar system and a car radar system for controlling a gate power supply and a drain power supply of an MMIC for a radar, protecting the MMIC at the start (rise) time and shut-on (fall) time of power supplies, and avoiding an occurrence of an obstacle in the MMIC due to a residual charge at the shut-off time or an abnormal power potential.

The radar system of the present invention includes an oscillator constituted by a high frequency IC with a built-in FET. The radar sends out electromagnetic waves to the outside, receives an echo from a target, and detects a relationship with the target on the basis of the received echo signal. Furthermore, the radar system is comprised of following a plurality of power supplies, a voltage monitoring means, a power supply control means.

The power supplies form respective different potential output voltages, wherein either of the power supplies is used as a gate power supply of the FET of the high frequency IC, and the other one of the power supplies is used as a drain power supply of the FET.

The voltage monitoring means detects whether output voltages of the power supplies are within respective specified ranges or not.

The power supply control means (here it is called the first power supply control means) turns of f the drain power supply of the FET among the power supplies when it is detected by the voltage monitoring means that even either of output voltages of the power supplies is not within the specified range.

By doing this, the drain of the FET does not go on being powered in a state that at least of output voltage of the gate power is not at a potential within the specified range, and the current to be supplied to the FET is prevented from being supplied outside the control area, thus the high frequency IC is protected.

Furthermore, to accomplish the above object, the following radar system is proposed.

In addition to the oscillator constituted by the high frequency IC with a built-in FET and the plural power supplies which are described above, the radar is equipped with a following power supply control means (here it is called as the second power supply control means).

The second power supply control means controls the gate and drain power supplies at the rise time so that an output voltage of the gate power supply rises earlier than the drain power supply.

By doing this, the drain of the FET is not powered unless the gate is powered, thus the high frequency IC is protected.

For example, the second power supply control means includes a timer circuit, and the output voltage of the gate power supply is controlled by time measurement by the timer circuit so as to rise earlier than that of the drain power supply. Thus the control means can be realized briefly.

Furthermore, to accomplish the above object, the following radar system is proposed. In addition to the oscillator composed by a high frequency IC with a built-in FET, and a plurality of power supplies which are described above, the radar is equipped with following a power supply control means (here it is called as the third power supply control means).

The third power supply control means controls the gate and drain power supplies at the fall time so that an output voltage of the gate power supply falls later than that of the drain power supply.

By doing this, the drain of the FET is not powered unless the gate is powered, thus the high frequency IC is protected.

For example, the third power supply control means a discharge circuit for discharging the drain power line, and the output voltage of the drain power supply is controlled so as to fall earlier than that of the gate power supply by discharging the drain power line. Thus the control means can be realized briefly.

Further, the radar system of the present invention also can be constituted by combination of the first power supply control means, the second power supply control means, and the third power supply control means. Thus, the radar system can control and execute all the protection of the FET at the start time of the power supplies, the protection of the FET at the turn-on time of the power supplies, and the protection of the FET at the shut-off time of the power supplies.

The aforementioned radar system of the present invention can be used as a car radar system of an inter-car range control system by loading in a vehicle such as an automobile. The car radar sends out electromagnetic waves outside the car, receives an echo from a target outside the car, and detects the relationship (namely inter-car range) with the target on the basis of the received signal.

DETAILED DESCRIPTION OF THE INVENTION

The embodiments of the present invention will be explained in detail hereunder with reference to the accompanying drawings.

Figure 1:
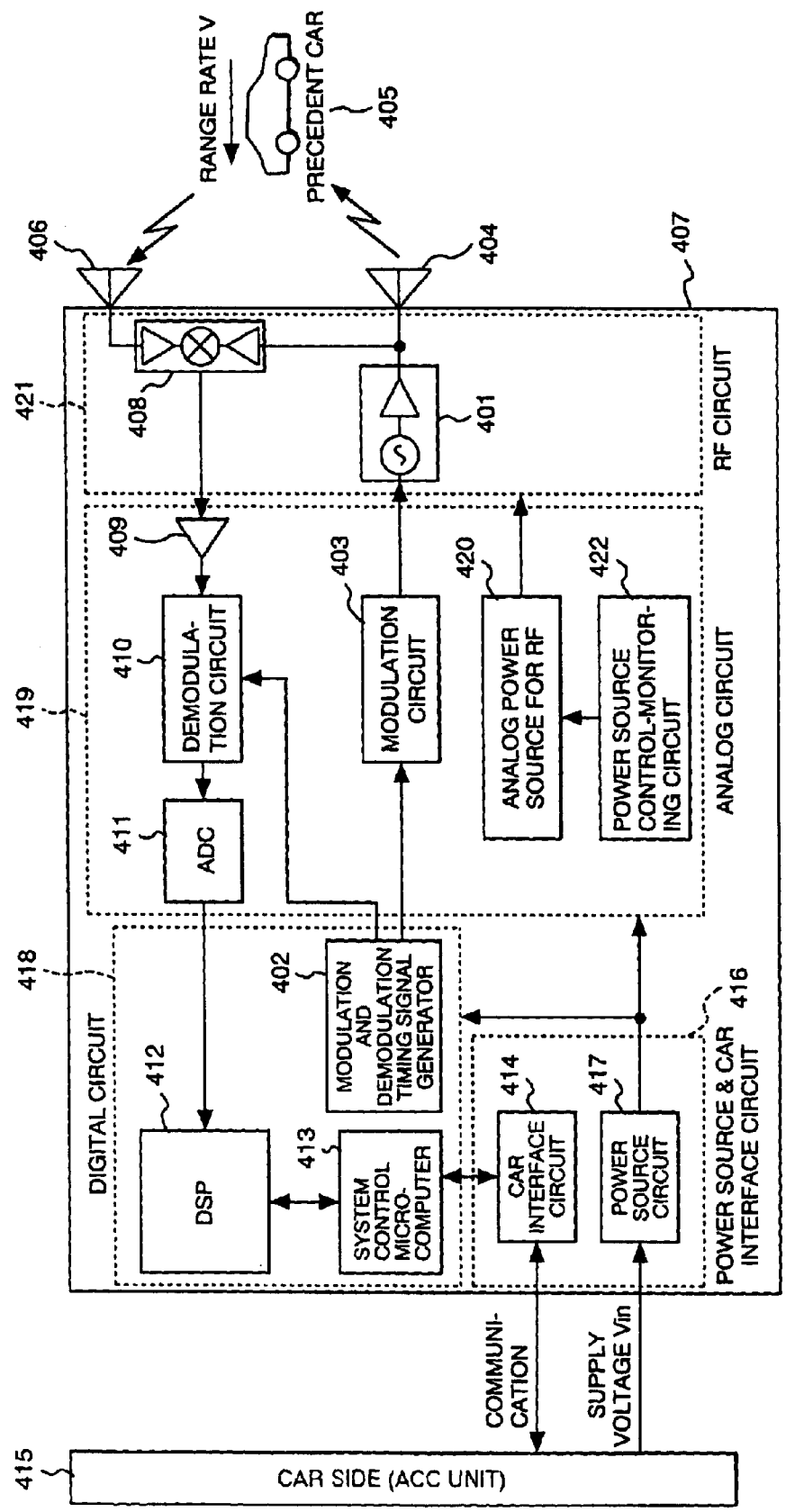
FIG. 1 is a block diagram showing the constitution of a car millimeter wave radar system to which an embodiment of the present invention is applied.

FIG. 1 shows the configuration of a millimeter wave radar system for car to which an embodiment of the present invention is applied. A millimeter wave radar system 407 has a power supply & car IF (interface) circuit 416, a digital circuit 418, an analog circuit 419, and an RF (Radio Frequency) circuit 421. Thus the radar system 407 is given a supply voltage Vin from a car-side host system 415, and executes two-way communication with the car-side host system 415.

The RF circuit 421 includes a high frequency IC (MMIC) with a built-in FET. A modulation/demodulation timing signal generator 402 outputs a modulation timing signal. A modulator 403 modulates a frequency for transmitting on the basis of the modulation timing signal, and a millimeter wave oscillator 401 transmits a transmitting signal (millimeter waves) at the frequency modulated by the modulator 403 from a transmitting antenna 404.

The transmitting signal is reflected from a precedent car 405, changed to a receiving signal (echo), and inputted to a receiving antenna 406. At this time, when there is a range rate V between the precedent car 405 and the millimeter wave radar system 407 (own car), a Doppler frequency is generated. The frequency of the receiving signal is equal to a Doppler-shifted transmitting frequency.

When the receiving signal passes through a mixer 408, the Doppler frequency (an intermediate frequency signal (hereinafter, referred to as an IF signal)) is output from the mixer 408. The IF signal is amplified by an amplifier 409 and then demodulated by a demodulation circuit 410 on the basis of the signal outputted from the modulation/demodulation timing signal generator 402. The demodulated signal is converted to a digital signal by an ADC (analog to digital converter) 411 and input to a DSP (digital signal processor) 412.

The DSP 412 performs FFT (Fast Fourier Transform) analysis for the input digital signal and obtains the range, range rate, and azimuth with the precedent car. And, the obtained information on range rate and range is output to the car-side host system 415 by a system control microcomputer 413 via a car interface circuit 414.

The circuits explained above are operated by electric power from a power source circuit (hereafter it is referred a power supply) 417 installed in the power source & car interface circuit 416. The supply voltage Vin is inputted to the power supply 417 from the car-side host system 415. The power supply 417 outputs the electrical power necessary for each circuit to operate on the basis of Vin. The outputted power is supplied to the digital circuit 418 and the analog circuit 419.

On the basis of the power from the power supply 417, an analog power supply 420 for RF outputs the power necessary for the analog circuit 419 and the RF circuit 421 to operate. A power source control & monitoring circuit 422 controls the operation timing of each power supplies (source circuit) and monitors the voltages.

Figure 2:
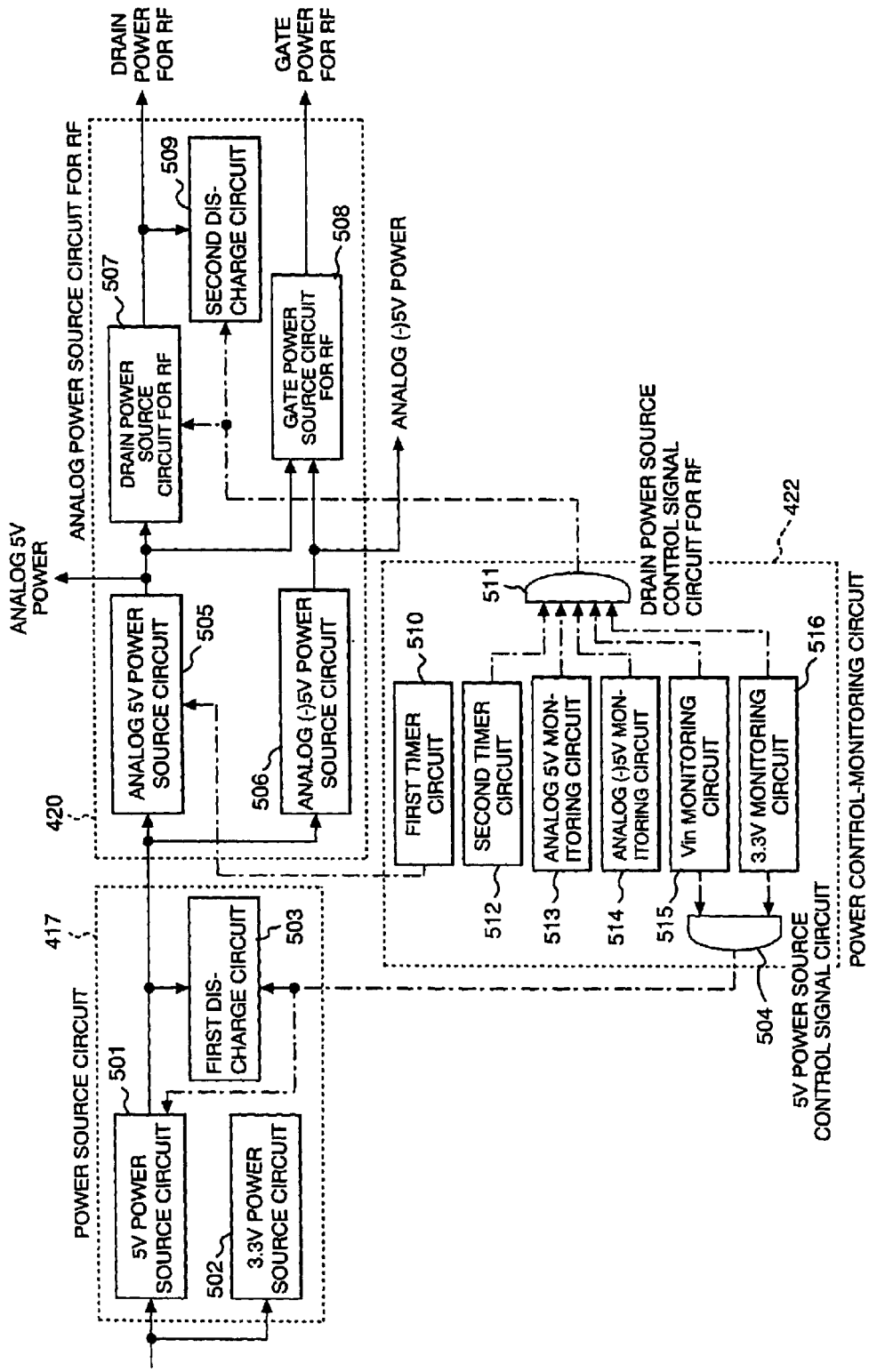
FIG. 2 is a block diagram showing the constitution of the power supply (power source circuit) and power source control-monitoring circuit of the car millimeter wave radar system shown in FIG. 1.

Next, the block constitution of the power supply 417, the analog power supply 420 for RF, and the power source control & monitoring circuit 422 will be explained in detail by referring to FIG. 2. Further, in FIG. 2, the solid lines indicate power lines and the dashed lines indicate control signals.

The power supply 417 has a 5V power source circuit (5V power supply) 501, a 3.3V power source circuit (3.3V power supply) 502, and a first discharge circuit 503.

The 5V power supply 501 is controlled in the on-off operation by a control signal from a 5V power source control circuit 504 of the power control & monitoring circuit 422. The 5V power supply 501 is constituted by a DC-DC converter circuit, and upon receipt of an ON signal, the 5V power supply 501 generates output voltage 5V with the DC-DC converter circuit on the basis of the supply voltage Vin.

The 3.3V power supply 502 is constituted by a DC-DC converter circuit, and when the supply voltage Vin is inputted, the 3.3V power supply 502 generates output voltage 3.3V with the DC-DC converter circuit on the basis of the supply voltage Vin.

The first discharge circuit 503 has a function for short-circuiting the 5V power line and GND terminal at the time of the ON operation and discharging the 5V power line. The first discharge circuit 503 is controlled in the ON-OFF operation by a control signal from the 5V power source control circuit 504. Namely the first discharge circuit 503 is operated so as to turn off when a signal for turning on the 5V power supply 501 is outputted from the 5V power source control circuit 504, and operated so as to turn on when a signal for turning off the 5V power supply 501 is outputted from the 5V power source control circuit 504.

The analog power supply 420 for RF has an analog 5V power supply 505, an analog (−)5V power supply 506, a drain power supply 507 for RF, a gate power supply 508 for RF, and a second discharge circuit 509.

The analog 5V power supply 505 is controlled in the ON-OFF operation by a control signal from a first timer circuit 510 of the power source control & monitoring circuit 422, and when it receives an ON signal, the built-in switching circuit turns on. Thereby an output voltage of the 5V power supply is supplied to the analog circuits and the drain power supply for RF.

The (−)5V power supply 506 is composed of a switching capacitor power source circuit etc., and when the 5V power is inputted, converts to the 5V power to the (−)5V power by the switching capacitor power source circuit.

The drain power supply 507 for RF includes a series regulator circuit and is controlled in the ON-OFF operation by a control signal from an RF drain power source control circuit 511 of the power source control & monitoring circuit 422. The drain power supply 507 for RF, upon receipt of the control signal from the RF drain power source control circuit 511, turns on the series regulator circuit, thereby supplies the drain power to the RF circuit 421.

The gate power supply 508 for RF, when the analog 5V power (−)5V power are supplied, supplies a gate power at a predetermined output voltage to the RF circuit 421.

The second discharge circuit 509 constitutes a part of the third power supply control means described in "SUMMARY OF THE INVENTION", and has a function for short-circuiting the drain power line for RF and GND terminal at the time of the ON operation and discharging the drain power line for RF. The second discharge circuit 509 is controlled in the ON-OFF operation by the control signal from the RF drain power source control circuit 511 of the power supply control & monitoring circuit 422. Namely the second discharge circuit 509 is operated so as to turn off when a signal for turning on the gate power supply 508 for RF is outputted from the drain power source control circuit 501 for RF, and operated so as to turn on when a signal for turning off the gate power supply 508 for RF is outputted. The second discharge circuit 509 prevents the gate power supply from shutting-off when some charge remains in the drain circuit.

The power source control & monitoring circuit 422 has the first timer circuit 510, a second timer circuit 512, an analog 5V monitoring circuit 513, an analog (−)5V monitoring circuit 514, a Vin monitoring circuit 515, a 3.3V monitoring circuit 516, the 5V power source control circuit 504, and the drain power source control circuit 511 for RF.

The first timer circuit 510 and the second timer circuit 512 constitutes a part of the second power supply control means described in "SUMMARY OF THE INVENTION", and the analog 5V monitoring circuit 513, the analog (−)5V monitoring circuit 514, the Vin monitoring circuit 515, and the 3.3V monitoring circuit 516 constitute a voltage monitoring means, and the drain power source control circuit 511 constitutes the first power supply control means described in "SUMMARY OF THE INVENTION".

The first timer circuit (timer 1) 510 and the second timer circuit (timer 2) 512 are a delay circuit. The first timer circuit 510, after a predetermined time from starting of the 3.3V power supply 502, outputs an ON signal to the analog 5V power supply 505. The second timer circuit 512, after a predetermined time longer than that of the first timer circuit 510 from starting of the 3.3V power supply 502, outputs an ON signal to the drain power supply 511 for RF.

The analog 5V monitoring circuit 513 monitors whether the voltage outputted from the analog 5V power supply 505 is higher than a predetermined voltage or not. When the output voltage of the analog 5V power supply lower than the predetermined voltage, the analog 5V monitoring circuit 513 outputs an OFF signal to the drain power source control circuit 511 for RF.

The analog (−)5V monitoring circuit 514 monitors whether the voltage outputted from the analog (−)5V power supply 506 is lower than a predetermined voltage or not. When the voltage of the analog (−)5V power supply increases higher than the predetermined voltage, the analog (−)5V monitoring circuit 514 outputs an OFF signal to the drain power source control circuit 511 for RF.

The Vin monitoring circuit 515 monitors whether the Vin supply voltage which is the original supply voltage is a higher than predetermined voltage or not. When the Vin supply voltage decreases lower than the predetermined voltage, the Vin monitoring circuit 515 outputs an OFF signal to the drain power source control circuit 511 for RF and the 5V power source control circuit 504.

The 3.3V monitoring circuit 516 monitors whether the voltage outputted from the 3.3V power supply 502 is higher than a predetermined voltage or not. When the output voltage of the 3.3V power supply decreases lower than the predetermined voltage, the 3.3V monitoring circuit 516 outputs an OFF signal to drain power source control circuit 511 and the 5V power source control circuit 504.

The drain power source control circuit 511 for RF is an AND circuit and inputs signals from the second timer circuit 512, the analog 5V monitoring circuit 513, the analog (–)5V monitoring circuit 514, the Vin monitoring circuit 515, and the 3.3V monitoring circuit 516. And only when these input signals are all ON, the drain power source control circuit 511 for RF outputs an ON signal to the drain power supply 507 for RF.

The 5V power source control circuit 504 is also an AND circuit and inputs signals from the Vin monitoring circuit 515 and the 3.3V monitoring circuit 516. And only when both input signals are on, the 5V power source control circuit 504 outputs an ON signal to the 5V power supply 501.

Next, the relationship between the drain power supply and the gate power supply for RF will be explained by referring to FIG. 3. The RF circuit 421 (refer to FIG. 1) has a built-in FET (p-HEMT) circuit with an AlGaAs/InGaAs double hetero structure having excellent high frequency characteristics.

The two power supplies of the drain power and the gate power for RF control the FET. The FET is an element able to control a drain current by controlling the gate voltage. Accordingly if a voltage is applied to the drain in a state that the gate voltage is not controlled, a large current flows through the FET. And in the worst case, the FET may be broken down by an excessive current.

Figure 3:
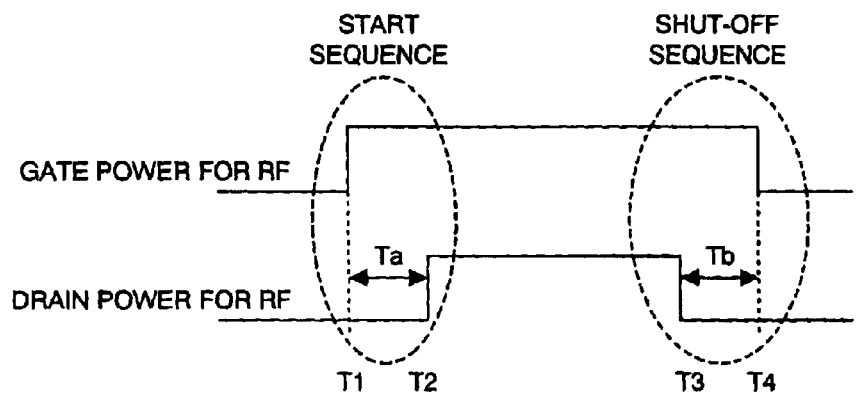
FIG. 3 is a timing chart showing the start and shut-off timing of the power to be supplied to the RF circuit of the car millimeter wave radar system of the present invention.

To prevent the FET built in the RF circuit 421 from breaking, as shown in FIG. 3, at the tome of starting the RF circuit 421, it is necessary to always start (rise) the gate power supply before starting of the drain power supply. Further, when shutting off the RF circuit 421, it is necessary to shut off (fall) the gate power supply after shutting off the drain power supply. In FIG. 3, the output voltage of the gate power supply rises at the point of time T1. And at the point of time T2 when a predetermined time Ta elapses after TI, the output voltage of the drain power supply rises. Further, the output of the drain power supply falls at the point of time T3, and at the point of time T4 when a predetermined time Tb elapses after T3, the gate power supply falls.

Next, the concrete circuit constitution examples of the respective circuits of the power source control & monitoring circuit 422 will be explained by referring to FIGS. 4 to 8.

Figure 4A:
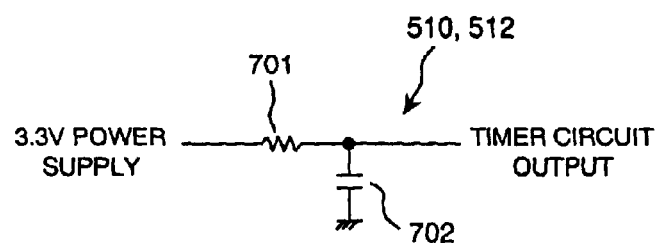
FIG. 4(a) is a circuit diagram showing the constitution of the timer circuit of this embodiment and FIG. 4(b) is a drawing showing the operation thereof.
Figure 4B:
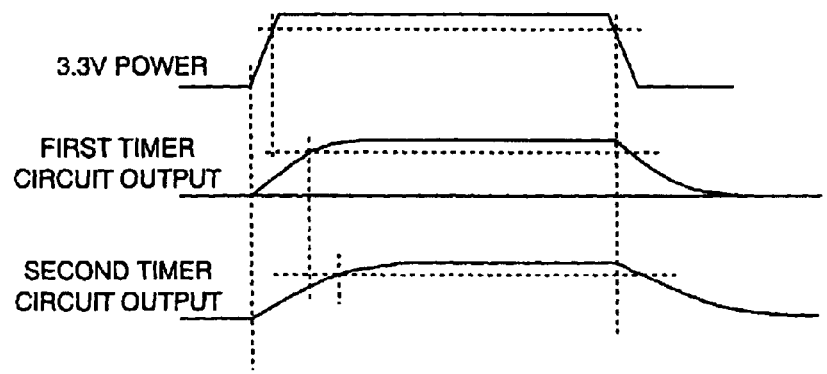

FIG. 4(*a*) shows a circuit constitution example of the first timer circuit 510 and the second timer circuit 512. The timer circuits are respectively constitute by a low-pass filter circuit to input an output voltage from the 3.3V power supply and output the 3.3V power with the delay of a predetermined time. The predetermined time (delay time) is set by adjusting the constants of the resistance of a resistor 701 and the capacity of a capacitor 702.

As shown in FIG. 4(*b*), a delay time of Td1 is set in the first timer circuit 510, and a delay time of Td2 is set in the second timer circuit 512.

The timer circuits may be constituted by a counter circuit for counting a predetermined time and performing a delay operation instead of the low-pass filter as shown in FIG. 4(*a*).

Figure 5:
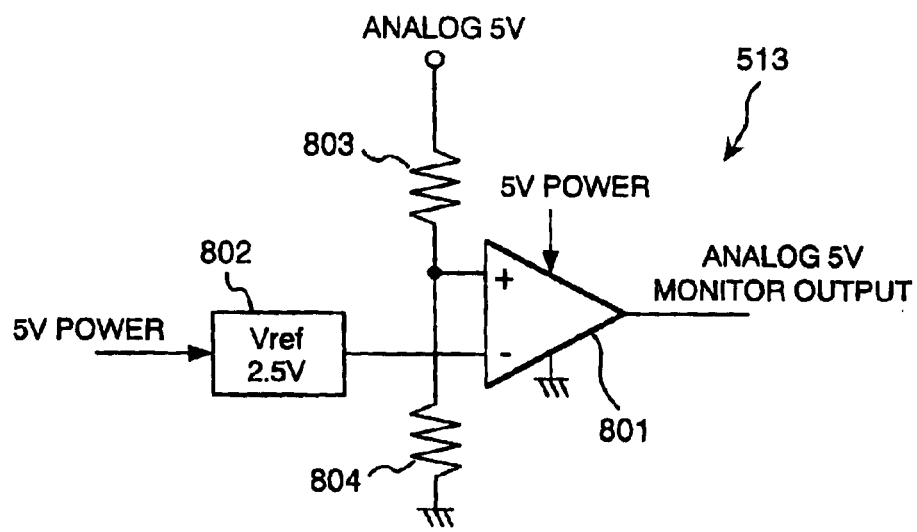
FIG. 5 is a circuit diagram showing the constitution of the analog 5V monitoring circuit of this embodiment.

FIG. 5 shows a circuit constitution example of the analog 5V monitoring circuit 513. The analog 5V monitoring circuit 513 is equipped with a comparator 801 operating at 5V and a shunt regulator 802. The voltage from the 5V power supply is regulated to 2.5V by shunt regulator 802, and 2.5V is inputted to the inverted terminal of the comparator 801 as a reference voltage. The analog 5V monitoring circuit 513 divides analog 5V by resistors 803 and 804, and inputs it as a voltage to be monitored to the non-inverted terminal of the comparator 801. By use of this circuit constitution, whether the output voltage of the analog 5V power supply is at a predetermined voltage or higher can be monitored.

Figure 6:
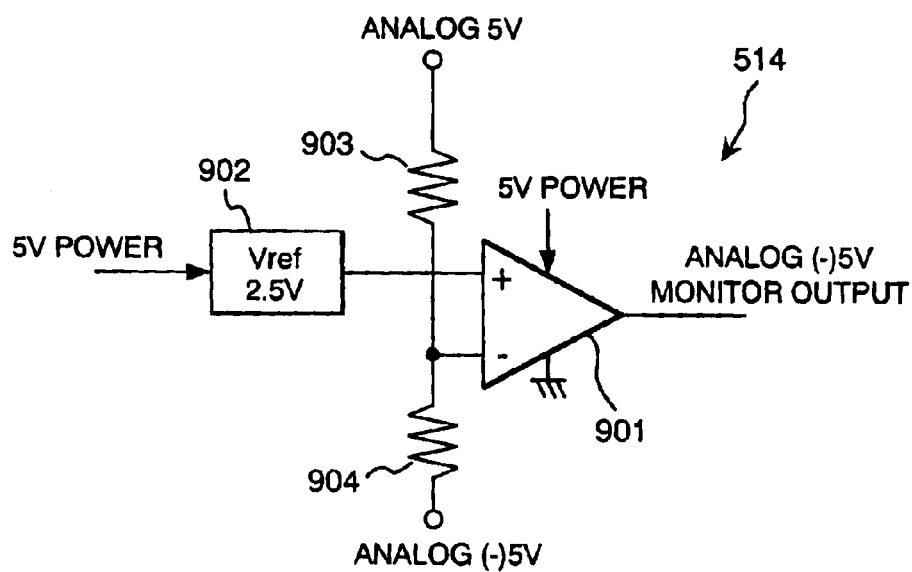
FIG. 6 is a circuit diagram showing the constitution of the analog (−)5V monitoring circuit of this embodiment.

FIG. 6 shows a circuit constitution example of the analog (–)5V monitoring circuit 514. The analog (–)5V monitoring circuit 514 is equipped with a comparator 901 operating at 5V and a shunt regulator 902. The output voltage from the 5V power supply is regulated to 2.5V by shunt regulator 902, and 2.5V is inputted to the non-inverted terminal of the comparator 901 as a reference voltage. The analog (–)5V monitoring circuit 514 divides the voltage between analog 5V and (–)5 v by resistors 903 and 904, and inputs it as a voltage to be monitored to the inverted terminal of the comparator 901. By use of this circuit constitution, whether the output voltage of the analog (–)5V power supply is at a predetermined voltage or higher can be monitored.

However, the monitoring results of the analog (–)5V monitoring circuit, since the analog 5V and analog (–)5V are divided and inputted as monitoring voltages, are subordinately effective only when the analog 5V power supply is normal. In this embodiment, since the output voltage of the analog 5V power supply is separately monitored by the analog 5V monitoring circuit 513, whether the monitoring results of the analog (–)5V monitoring circuit 514 are effective or not can be judged.

Figure 7:
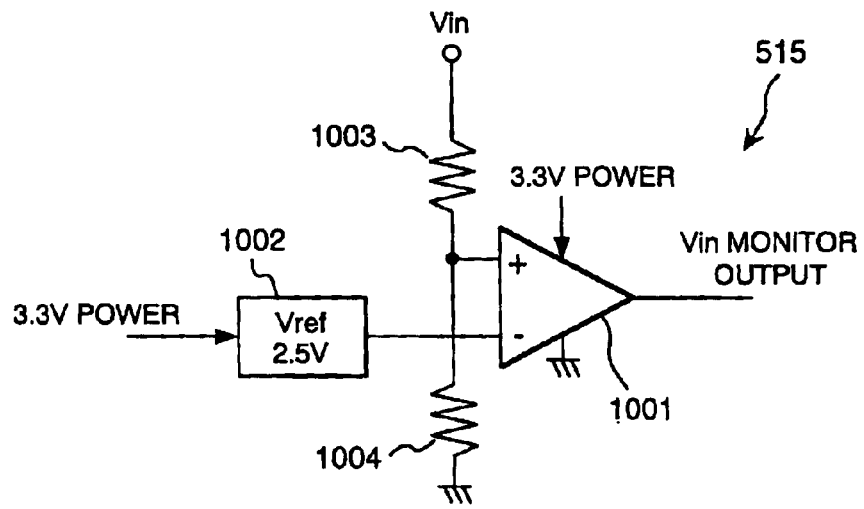
FIG. 7 is a circuit diagram showing the constitution of the Vin monitoring circuit of this embodiment.

FIG. 7 shows a circuit constitution example of the Vin monitoring circuit 515. The Vin 5V monitoring circuit 515 is equipped with a comparator 1001 operating at 3.3V and a shunt regulator 1002. The output voltage from the 3.3V power supply is regulated to 2.5V by shunt regulator 1002, and 2.5V is inputted to the inverted terminal of the comparator 1001 as a reference voltage. The Vin monitoring circuit 515 divides Vin voltage by resistors 1003 and 1004, and inputs it as a voltage to be monitored to the non-inverted terminal of the comparator 1001. By use of this circuit constitution, whether the Vin voltage is at a predetermined voltage or higher can be monitored.

The 3.3V monitoring circuit 516 judges using a voltage monitoring IC whether the output voltage of the 3.3V power supply is at a predetermined voltage or higher. The circuit can be realized by using a signal of a voltage monitoring function such as an external watch dog IC for a microcomputer which is not shown in the drawing.

Figure 8:
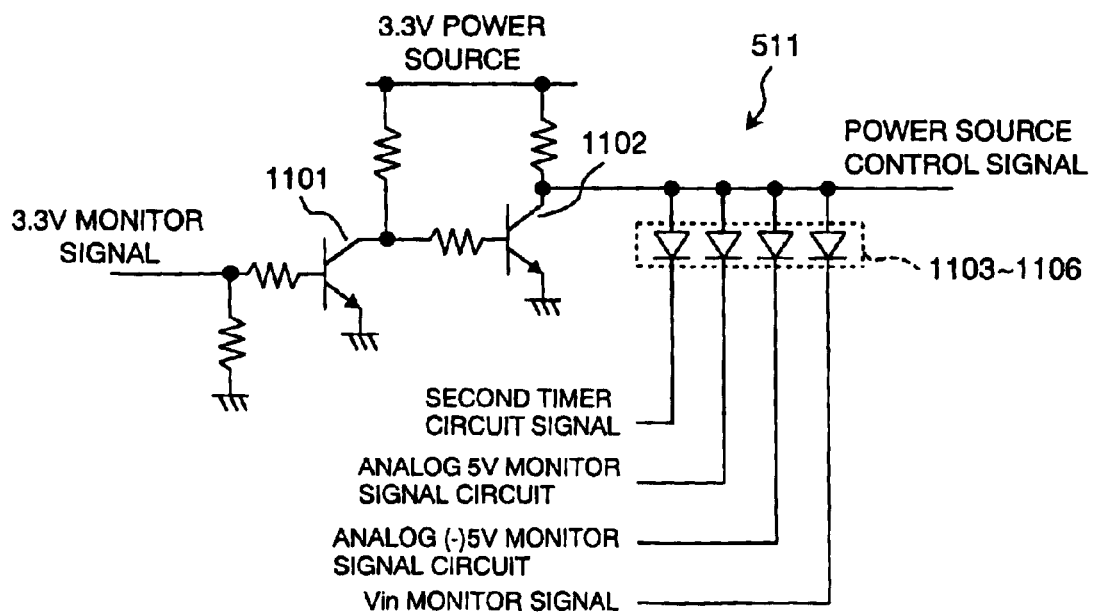
FIG. 8 is a circuit diagram showing the constitution of the power source control circuit of this embodiment.

FIG. 8 shows a circuit constitution example of the drain power source control circuit 511 for RF. The drain power source control circuit 511 inputs an output signal of the 3.3V monitoring circuit 516 to an inversion circuit 1101 and turns an NPN transistor 1102 on or off. When an input signal of the inversion circuit 1101 is low, an output signal of the inversion circuit goes high, and the NPN transistor 1102 is turned on, and a power source (power supply) control signal goes low.

In this circuit constitution, the 3.3V power supply rise up to the VBE of the NPN transistor 1102 and simultaneously operates so as to shift the output on the low level, so that the drain power supply 507 for RF will not be turned on in an unstable state.

Input signals other than a 3.3V monitoring signal are input via diodes 1103 to 1105. Since signals are input by the diodes like this, when even any one of the input signals other than the 3.3V monitoring signal is low, the output signals cannot be made high. The circuit constitution of the 5V power source control circuit 504 is the same as that of the drain power source control circuit 511 for RF except different input signals.

Figure 9:
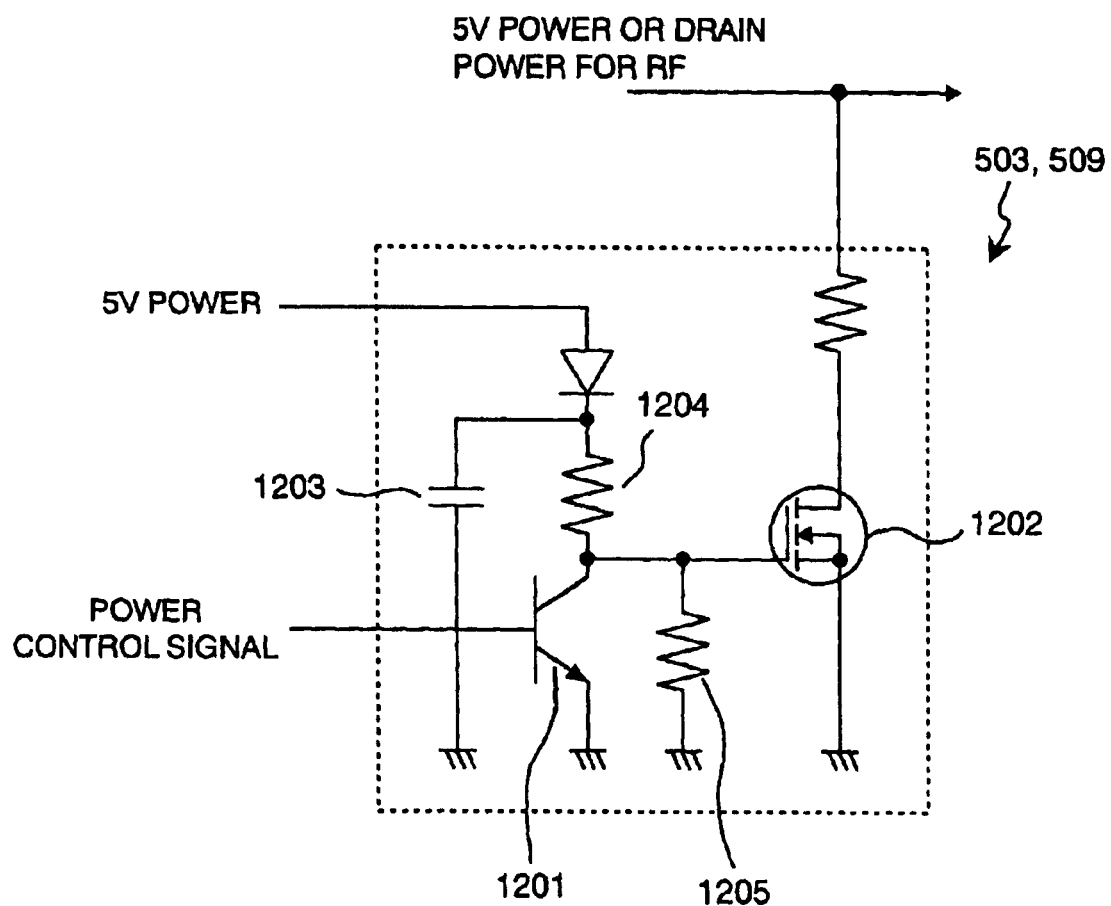
FIG. 9 is a circuit diagram showing the constitution of the discharge circuit of this embodiment.

Next, a circuit constitution example of the first discharge circuit 503 and the second discharge circuit 509 will be explained by referring to FIG. 9. The first discharge circuit 503 and the second discharge circuit 509 can be composed of the same circuit, and when the power supply control signal is low, the NPN transistor 1201 is turned off, and a high signal is input to the gate of an FET 1202 from the 5V power supply, and the FET 1202 is turned on. By doing this, when the control signal is low, even if the drain power supply is turned on by mistake, no voltage is supplied to this terminal.

When the output voltage of 5V power supply becomes 0V at the time of shut-off of the power supply (at the fall time), by the charge stored in a capacitor 1203, until the charge is discharged from resistors 1204 and 1205, the FET 1202 can be surely kept in the on state, so that the time for discharging the 5V power line and drain power line can be held.

Figure 10:
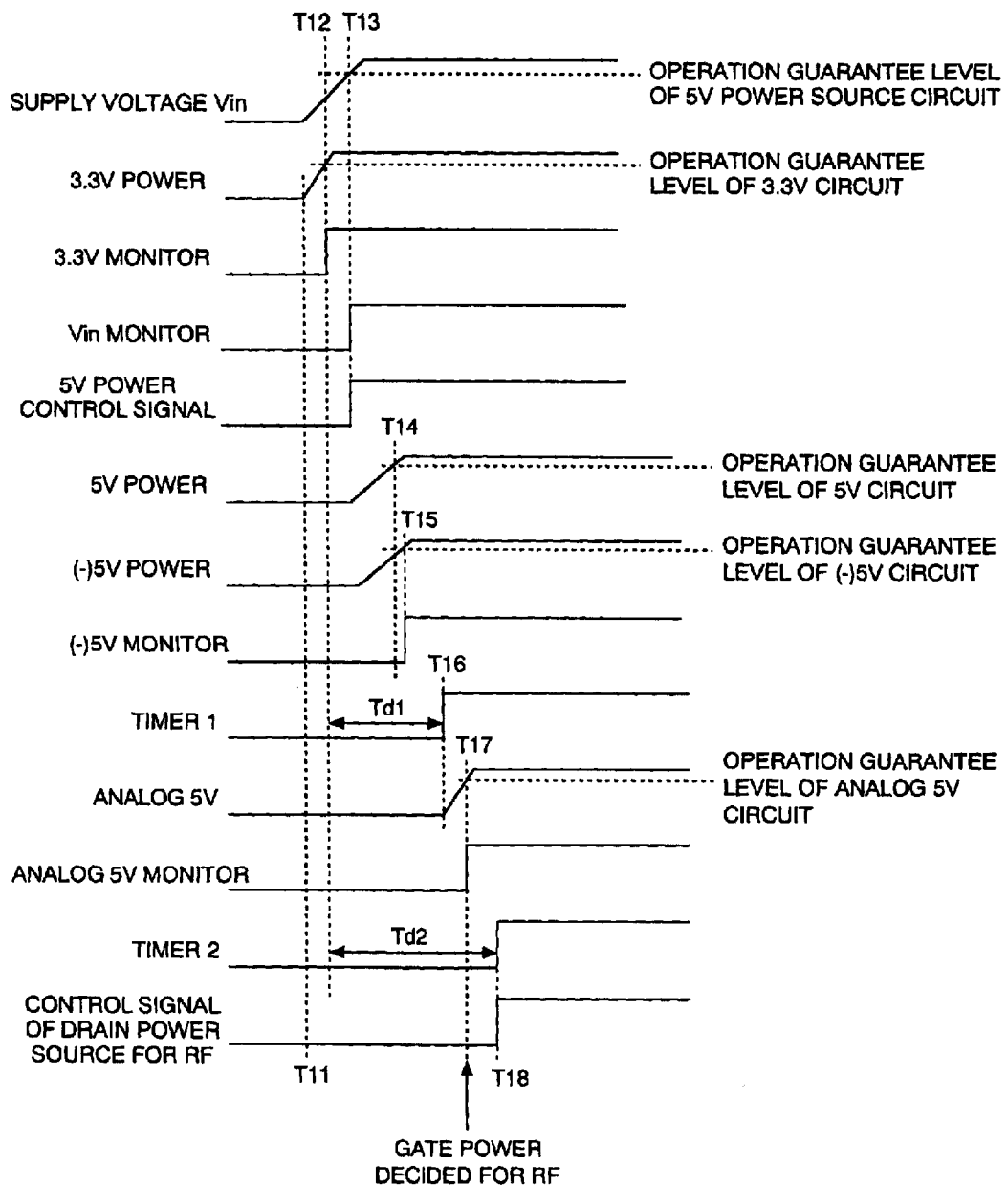
FIG. 10 is a time chart showing the start operation of the power supply of this embodiment.

Next, the operation at the time of start of the power supply will be explained by referring to the time chart shown in FIG. 10.

Firstly, at the point of time T11, the supply voltage Vin is supplied from the car side, and starts (rises). Simultaneously with the start of the Vin power supply, the output voltage of the 3.3V power supply starts (rises).

Thereafter, at the point of time T12, when the output voltage of the 3.3V power supply reaches the operation guarantee levels of 3.3V power system circuits, the output of the 3.3V monitoring circuit 516 goes high. Further, at the point of time T13, when the output voltage of the Vin power supply reaches the operation guarantee level of the 5V power supply circuit 501, the output of the Vin monitoring circuit 515 goes high.

At the point of time T13, input signals of the 5V power source control circuit 504 go all high and the output of the 5V power control signal goes high. By doing this, the 5V power supply 501 operates, and the output voltage of the 5V power supply starts (rises), and at the point of time T14, the output voltage of the 5V power supply reaches the operation guarantee levels of the 5V power system circuits.

In correspondence with the start (rises) of the 5V power supply, the (–)5V power supply also starts (rises) and at the point of time T15, when the (–)5V power supply reaches the operation guarantee levels of the (–)5V power system circuits, the output of the (–)5V monitoring circuit goes high.

Thereafter, at the point of time T16 when a predetermined time of Td1 elapses from the point of time T12, the output of the first timer circuit (timer 1) 510 goes high and the analog 5V power supply 501 is operated.

When the output voltage of the analog 5V power supply rises and at the point of time T17, the analog 5V power supply reaches the operation guarantee levels of the analog 5V power system circuits, the output of the analog 5V monitoring circuit 513 goes high.

At the point of time T17, both supply voltages of analog 5V and analog (–)5V are supplied, so that the gate power supply 508 for RF is operated and the gate voltage for RF is decided.

Thereafter, the output of the second timer circuit (timer 2) 512 measuring a predetermined time of Td2 from the point of time T12 goes high. At the point of time T18, the input signals of the drain power source control circuit 511 for RF all go high, and a the drain power supply control signal for RF goes high, and the output voltage of the RF drain supply is supplied. Since such a start (rise) sequence is performed, at the time of start, a voltage for causing failure to the RF circuit 421 will not be applied.

Figure 11:
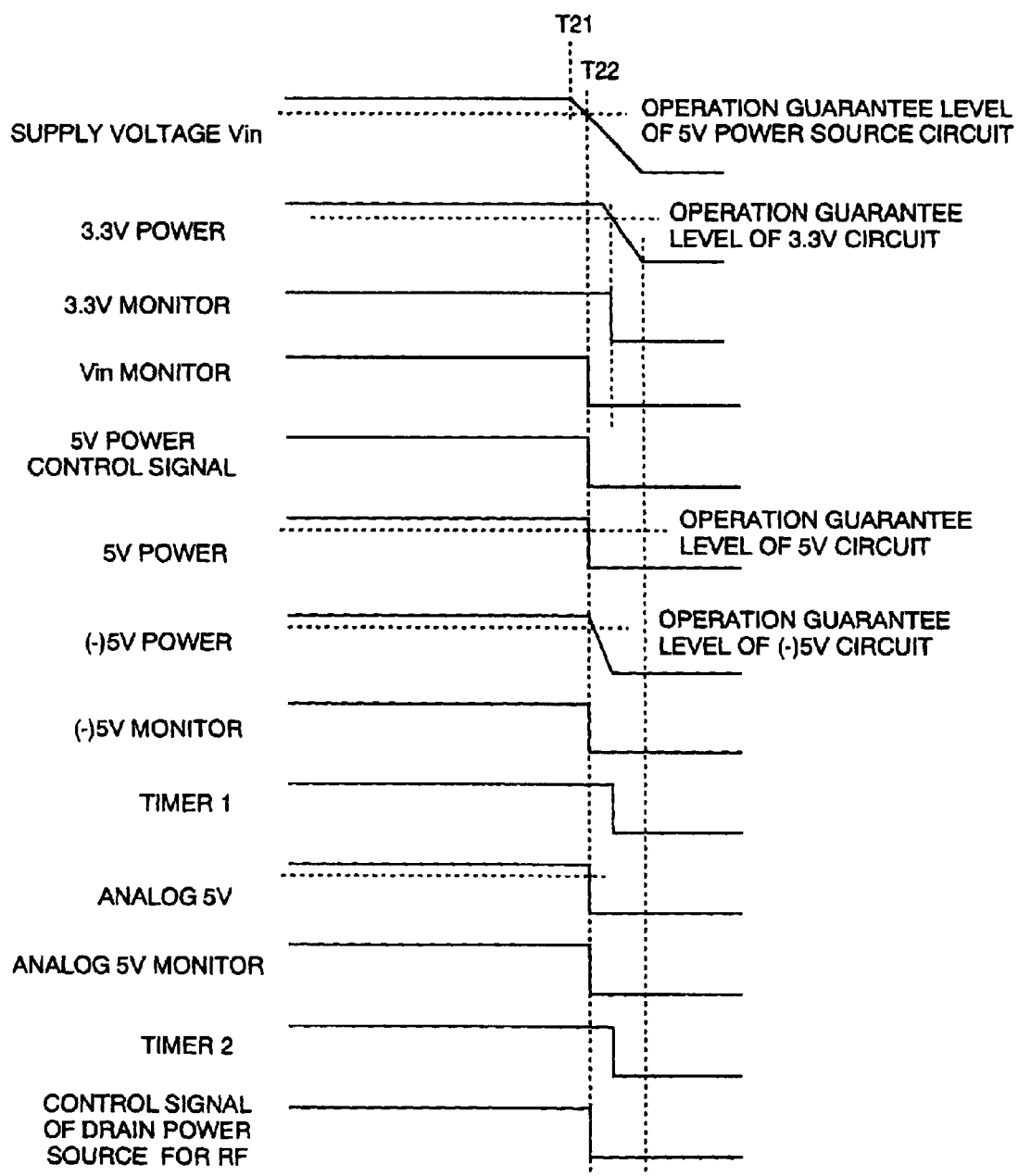
FIG. 11 is a time chart showing the shut-off of the power supply of this embodiment.
Figure 12:
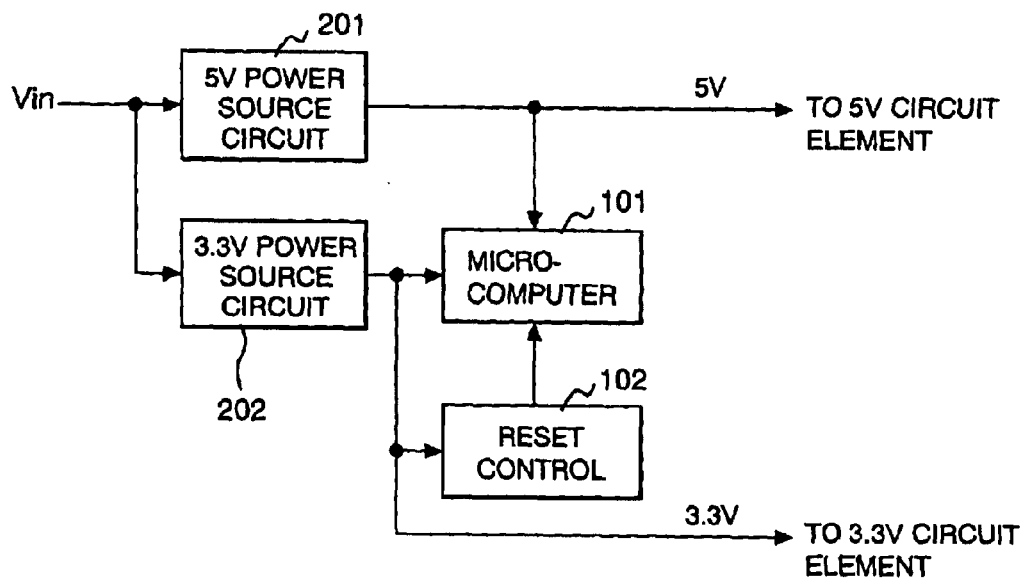
FIG. 12 is a drawing showing a conventional example of the constitution of a plurality of power supplies.
Figure 13:
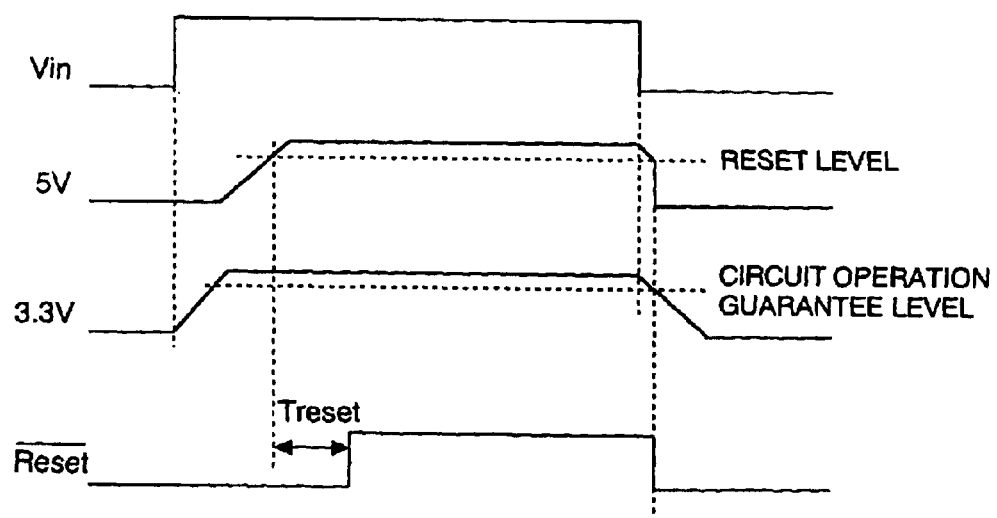
FIG. 13 is a time chart showing the start and shut-off operations of a conventional plurality of power supplies.
Figure 14:
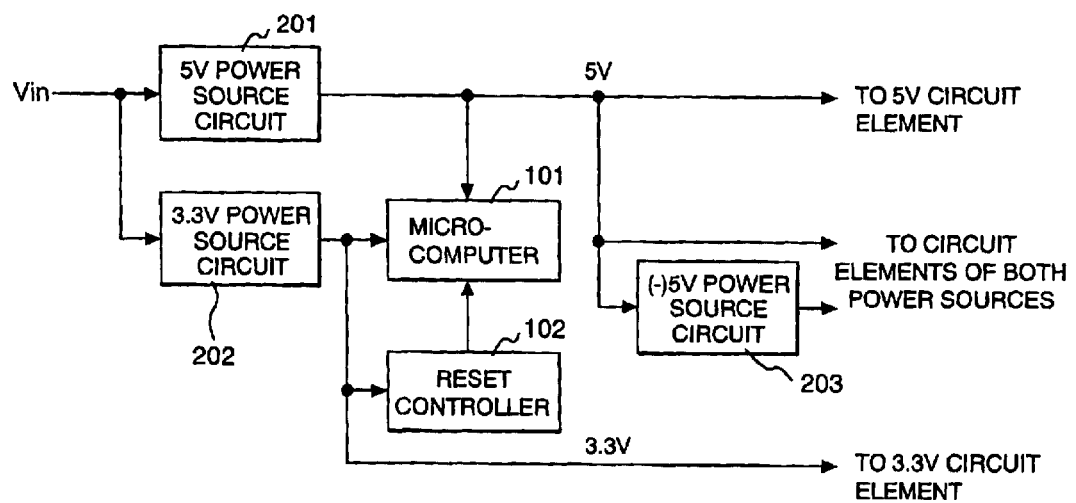
FIG. 14 is a drawing showing the circuit constitution that the star and shut-off operations cannot be specified by the conventional plurality of power supplies.

Next, the operation at the time of shut-off of the power supply will be explained by referring to the time chart shown in FIG. 11.

Firstly, at the point of time T21, the supply of the supply voltage Vin is stopped and the supply voltage Vin lowers. When the supply voltage Vin lowers down to the operation guarantee level of the 5V power supply (at the point of time T22), the output of the Vin monitoring circuit 515 goes low. By doing this, the 5V power control signal of the 5V power source circuit 504 and the drain power control signal of the drain power source control circuit 511 go low.

When the 5V power control signal of the 5V power source control circuit 504 goes low, the 5V power supply 501 is turned off, and the supply of 5V power is stopped, and the first discharge circuit simultaneously discharges the 5V power line. As a result, the output voltage of the 5V power supply suddenly lowers.

When the drain power supply control signal of the drain power source control circuit 511 for RF goes low in the same way, the drain power supply 507 for RF is turned off, and the supply of the drain power is stopped, and the second discharge circuit 509 simultaneously discharges the drain power line.

As a result, the voltage of the drain power supply suddenly lowers. At this time, since the gate power supply is not provided with a discharge circuit, so that the output voltage of the drain supply falls earlier than the output of the gate supply. By this operation, also at the time of shut-off of the power supply, a power supply shut-off sequence causing no failure to the RF circuit 421 can be realized.

An embodiment of the present invention is described in detail above. However, the present invention is not limited to the aforementioned embodiment and without being deviated from the spirit of the claims, various modifications are available in the design.

In the aforementioned embodiment, the circuit constitution is broadly divided into the power supply car interface circuit 416, the digital circuit 418, the analog circuit 419, and the RF circuit 421. However, to realize the present invention, the circuit constitution is not necessarily divided in such a way and for miniaturization, the power supply—car interface circuit 416, the digital circuit 418, and the analog circuit 419 may be mounted on one substrate. Or, all the circuits may be integrated in the RF circuit 421.

As shown by the above explanation, by use of the radar system and car radar system of the present invention, at the rise time (ex. the start time) and the fall time (ex. shut-off) of the power supply, the power can be supplied and stopped safely without causing failure to the RF circuit.

What is claimed is:

1. A radar system including an oscillator constituted by a high frequency IC with a built-in FET, sending out electromagnetic waves to the outside, receiving an echo from a target, and detecting a relationship with said target on the basis of the received echo signal, comprising:

a plurality of power supplies for forming respective different output voltages, wherein either of said power supplies is used as a gate power supply of said FET of said high frequency IC, and the other one of said power supplies is used as a drain power supply of said FET;

a voltage monitoring means for detecting whether the output voltages of said power supplies are within respective specified ranges or not, and a power supply control means for turning off said drain power supply of said FET among said power supplies when it is detected by said voltage monitoring means that either of output voltages of said power supplies is not within said specified range.

2. A car radar system comprising a radar system stated in claim 1, wherein said radar system is provided in a car, sends out electromagnetic waves outside said car, receives an echo from a target outside said car, and detecting a relationship with said target on the basis of the received echo signal.

3. A radar system including an oscillator constituted by a high frequency IC with a built-in FET, sending out electromagnetic waves to the outside, receiving an echo from a target, and detecting a relationship with said target on the basis of the received echo signal, comprising:

a plurality of power supplies for forming respective different output voltages, wherein either of said power supplies is used as a gate power supply of said FET of said high frequency IC, and the other one of said power supplies is used as a drain power supply of said FET; and a power supply control means for controlling said gate and drain power supplies at the rise time so that an output voltage of said gate power supply rises earlier than that of the drain power supply.

4. A radar system according to claim 3, wherein said power supply control means includes a timer circuit, and said output voltage of said gate power supply is controlled by time measurement by said timer circuit so as to rise earlier than that of said drain power supply.

5. A radar system according to claim 3, said power supply control means has also a function for controlling said gate and drain power supplies at the fall time so that an output voltage of said gate power supply falls later than that of said drain power supply.

6. A radar system including an oscillator constituted by a high frequency IC with a built-in FET, sending out electromagnetic waves to the outside, receiving an echo from a target, and detecting a relationship with said target on the basis of the received echo signal, comprising:

a plurality of power supplies for forming respective different output voltages, wherein either of said power supplies is used as a gate power supply of said FET of said high frequency IC, and the other one of said power supplies is used as a drain power supply of said FET; and a power supply control means for controlling said gate and drain power supplies at the fall time so that an output voltage of said gate power supply falls later than that of said drain power supply.

7. A radar system according to claim 6, wherein said power supply control means includes a discharge circuit for discharging the drain power line, and said output voltage of said drain power supply is controlled so as to fall earlier than that of said gate power supply by discharging said drain power line.

* * * * *